United States Patent [19]

Hara

[11] Patent Number: 4,670,664

[45] Date of Patent: Jun. 2, 1987

[54] COMPACT ELECTRONIC EQUIPMENT

[75] Inventor: Kazuya Hara, Tokyo, Japan

[73] Assignee: Casio Computer Co., Ltd., Tokyo, Japan

[21] Appl. No.: 632,199

[22] Filed: Jul. 18, 1984

[30] Foreign Application Priority Data

Jul. 26, 1983 [JP] Japan ............................ 58-115661[U]
Nov. 2, 1983 [JP] Japan ................. 58-204707

[51] Int. Cl.$^4$ .............................................. G06F 15/02
[52] U.S. Cl. ................................. 307/150; 200/5 R; 200/5 A; 429/127; 429/98; 340/759; 368/204; 364/712
[58] Field of Search ............... 307/150; 364/707, 708, 364/709, 700, 712; 361/397, 398, 399, 395, 392, 401, 408, 415; 200/5 A, 5 R, 159 B; 340/756, 711, 815.2; 368/203, 204; 429/1, 98, 97, 99, 124, 121, 138, 141, 144, 164, 127, 162, 191, 178, 192

[56] References Cited

U.S. PATENT DOCUMENTS

| 3,023,259 | 2/1962 | Coler et al. ........................ 429/127 |
| 3,421,944 | 1/1969 | Bauer . |
| 3,824,582 | 7/1974 | Glaser et al. .................... 340/759 X |
| 3,911,663 | 10/1975 | Kern et al. ......................... 368/204 |
| 3,977,176 | 8/1976 | Murakami et al. ................ 368/204 X |
| 4,002,892 | 1/1977 | Zielinski ......................... 307/150 X |
| 4,015,422 | 4/1977 | Van Haaften ................. 340/815.2 X |
| 4,085,253 | 4/1978 | Johnson . |
| 4,092,464 | 5/1978 | Dey et al. ......................... 429/127 |
| 4,158,230 | 6/1979 | Washizaka et al. ............ 200/5 A X |
| 4,177,519 | 12/1979 | Kasubuchi et al. ............. 361/398 X |
| 4,374,186 | 2/1983 | McCartney et al. ........... 429/194 X |
| 4,436,792 | 3/1984 | Tomino et al. ........................ 429/1 |

FOREIGN PATENT DOCUMENTS

| 2007506 | 3/1971 | Fed. Rep. of Germany . |
| 2414603 | 10/1974 | Fed. Rep. of Germany . |
| 1137844 | 4/1957 | France ............................... 368/204 |
| 2119994 | 8/1972 | France . |
| 0032766 | 3/1978 | Japan ................................ 368/203 |
| 0122357 | 9/1980 | Japan .................................. 429/98 |
| 0139760 | 10/1980 | Japan .................................. 429/98 |
| 56-61770 | 5/1981 | Japan . |
| 56-84872 | 7/1981 | Japan . |
| 356806 | 10/1961 | Switzerland . |
| 2116777 | 2/1983 | United Kingdom . |

Primary Examiner—William M. Shoop, Jr.
Assistant Examiner—Shik-Luen Paul Ip
Attorney, Agent, or Firm—Frishauf, Holtz, Goodman & Woodward

[57] ABSTRACT

In compact card-like equipment having an IC chip and a power source cell, an equipment case has a multilayered structure of a pair of upper and lower sheets and a pair of upper and lower panels laminated on a frame, respectively. A flexible substrate and a paper-like cell as a primary cell are provided in the equipment case. The paper-like cell has a pair of positive and negative electrode sheets and a power generating unit interposed therebetween. A sealing member seals the peripheries of the electrode sheets of the paper-like cell. The paper-like cell is received in a receptacle space formed in the frame. The flexible substrate is received in another receptacle space formed in the frame. The electrode sheets of the paper-like cell are electrically connected to terminals of the flexible substrate by means of a film-like connecting member. This compact card-like electronic equipment such as a calculator is thin and compact in size.

19 Claims, 14 Drawing Figures

F I G. 4
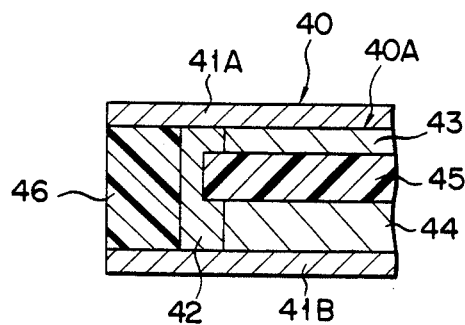
F I G. 5
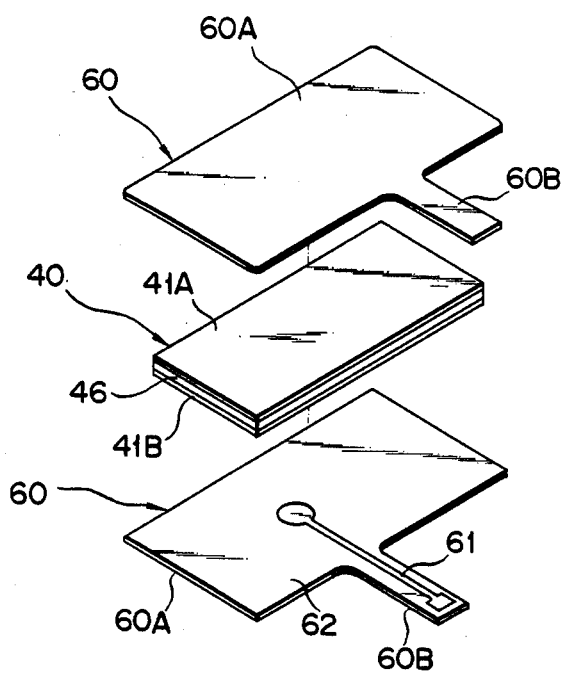

F I G. 6
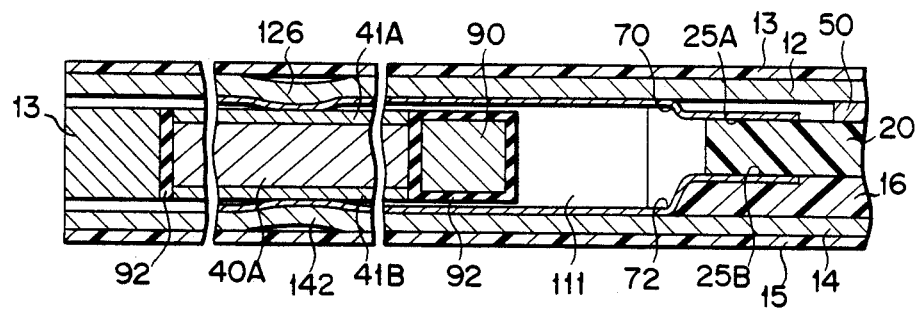
F I G. 8
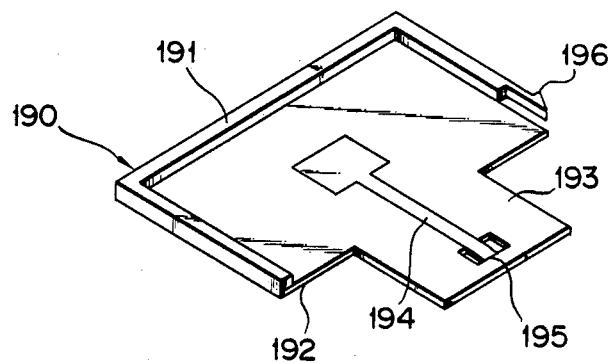

COMPACT ELECTRONIC EQUIPMENT

BACKGROUND OF THE INVENTION

The present invention relates to compact electronic equipment which uses a paper-like cell as a power source.

Various types of compact card- or sheet-like electronic equipment such as electronic calculators having a very small thickness of up to about 1 mm have been recently developed. Compact electronic equipment of this type generally has a solar cell having a thickness of about 0.2 mm as a power source cell.

However, with compact electronic equipment having a memory and/or timepiece function, if a solar cell is used as a power source cell, the solar cell cannot receive a sufficient amount of light at times such as at nighttime. The power source voltage cannot then be supplied, and the stored memory contents are lost or the timepiece function cannot be obtained. In view of this problem, compact electronic equipment of this type must have a primary cell.

Such primary cells include button-shaped cells such as a mercury cell, a silver oxide cell, or a lithium cell. A button-shaped cell has a considerably large thickness as compared with a solar cell. For example, the thinnest button-shaped lithium cell available on the market today has a thickness of 1.6 mm. Compact electronic equipment having a memory and/or timepiece function must use such a button-shaped cell and therefore has a considerably larger thickness than compact electronic equipment using a solar cell.

SUMMARY OF THE INVENTION

It is an object of the present invention to provide compact electronic equipment which allows the use of an extremely thin power source cell, is compact in size and thin, and can have a memory and/or timepiece function.

The compact electronic equipment of the present invention comprises sheet-like upper case means and sheet-like lower case means having a shape substantially corresponding to the upper case means. The upper and lower case means define two receptacle spaces for receiving an IC chip and a paper-like cell. The paper-like cell has a pair of negative and positive electrode sheets, a power generating unit interposed between the electrode sheets, and a sealing member adhered at the peripheries of the pair of electrode sheets so as to provide a seal around the power generating unit. Conductive lead means is arranged to electrically connect the pair of electrode sheets of the paper-like cell to the IC chip. The periphery of the upper case means is fixed to that of the lower case means by a fixing means.

With this structure, in particular with the use of a thin paper-like cell as a primary cell, the compact electronic equipment can be rendered very thin and compact in size. The compact electronic equipment can also have a memory and/or timepiece function, thereby providing multifunction equipment.

According to a preferred embodiment of the present invention, the conductive lead means comprises two film-like connecting members each having a conductor formed on a plastic film. The film-like connecting members are adhered to the surface of the paper-like cell with an adhesive.

With the above-mentioned structure, the compact electronic equipment is rendered thinner and smaller. In particular, a good connection is made between the paper-like cell and a flexible substrate by means of very thin film-like connecting members.

According to another embodiment of the present invention, the conductive lead means comprises two connecting members which are respectively fixed on the inner surfaces of the upper and lower case means. Each electrode sheet of the paper-like cell is in contact with a conductor of the corresponding connecting member. An opening is formed in the lower case means so as to communicate with a receptacle space. The paper-like cell received in the receptacle space can be removed from the equipment through this opening.

The compact electronic equipment having this structure can simply and easily receive the paper-like cell and allows easy replacement thereof.

According to still another embodiment of the present invention, the conductive lead means comprises extended portions of the pair of electrode sheets of the paper-like cell. The extended portions are in contact with the inner surfaces of the upper and lower case means, respectively.

The compact electronic equipment having the above-mentioned structure can be manufactured with ease.

BRIEF DESCRIPTION OF THE DRAWINGS

FIG. 4 is an enlarged sectional view of a paper-like cell received in the compact electronic calculator shown in FIG. 1;

FIG. 5 is a perspective view showing a paper-like cell and film-like connecting members which are received in the compact electronic calculator shown in FIG. 1;

FIG. 6 is a partially enlarged sectional view showing a card-like electronic calculator according to another embodiment of the present invention;

FIGS. 8 and 9 are perspective views showing modifications of the cell receiving member;

DETAILED DESCRIPTION OF THE PREFERRED EMBODIMENTS

A compact card-like electronic calculator as compact electronic equipment according to an embodiment of the present invention will be described with reference to the accompanying drawings.

Figure 1:
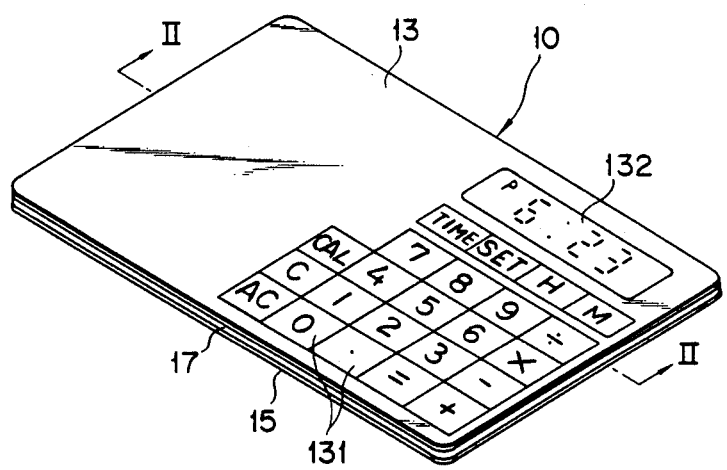
FIG. 1 is a perspective view schematically showing a compact card-like electronic calculator according to an embodiment of the present invention.

FIG. 1 shows the outer appearance of the compact card-like electronic calculator. The calculator is of the type which has a calculating function with a memory, and a timepiece function.

Figure 2:
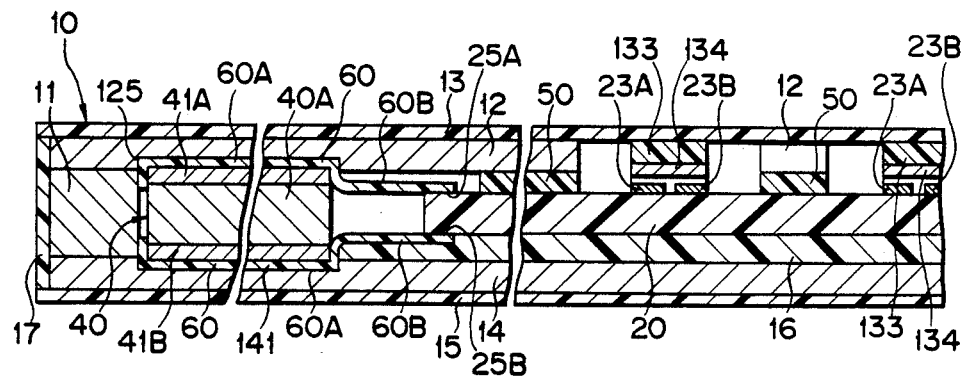
FIG. 2 is a partially enlarged sectional view of the compact electronic calculator shown in FIG. 1 along the line II—II therein.
Figure 3:
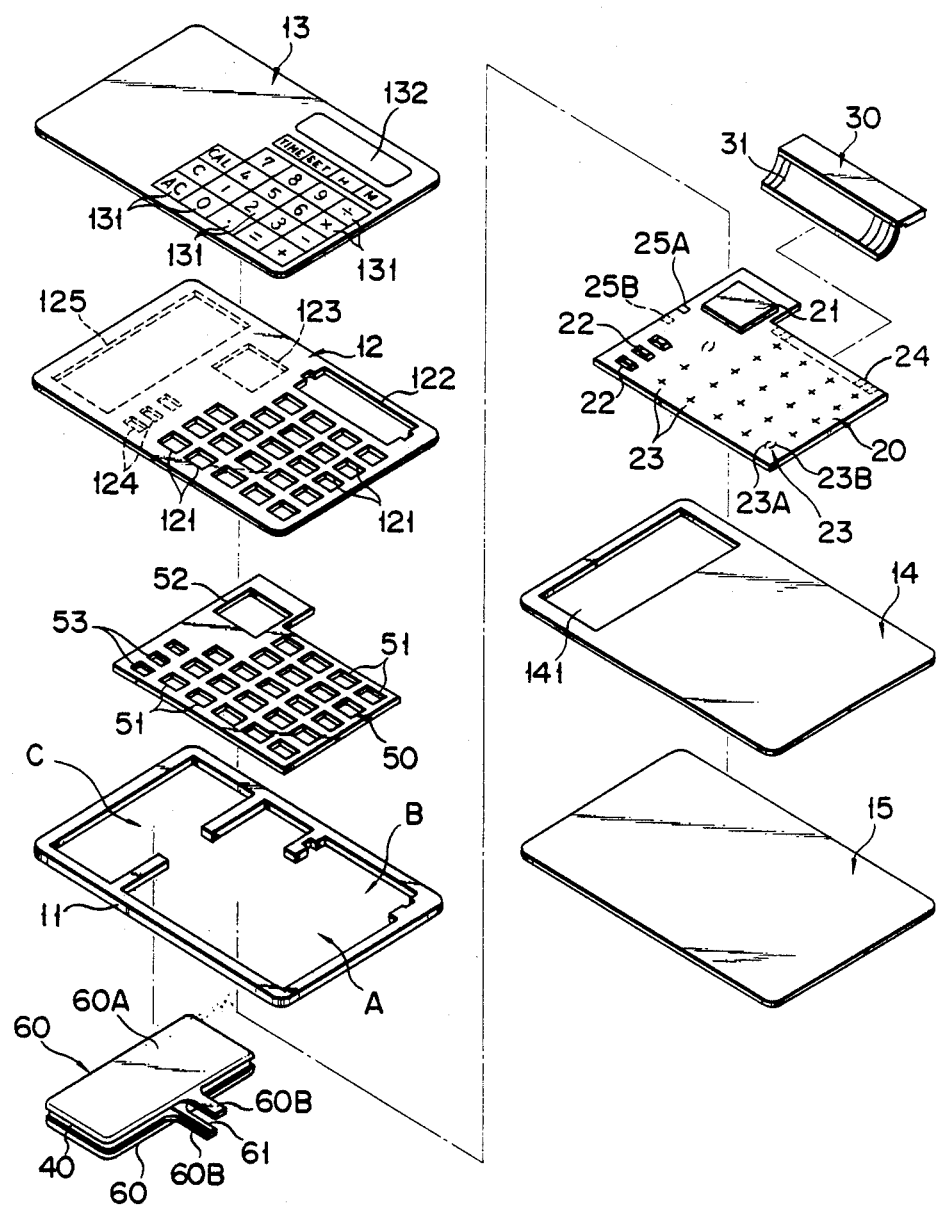
FIG. 3 is an exploded perspective view of the compact electronic calculator shown in FIG. 1.

FIG. 2 is a sectional view of the calculator of FIG. 1 along the line II—II therein, and FIG. 3 is an exploded perspective view thereof. The structure of this calculator will be described with reference to FIGS. 1 to 3.

The calculator has a case 10. As shown in FIG. 3, the case 10 has a multilayer structure wherein an upper panel 12 and an upper sheet 13 are laminated on the upper surface of a frame 11, and a lower panel 14 and a lower sheet 15 are laminated on the lower surface of the frame 11. As shown in FIG. 3, a flexible film-like substrate 20, a very thin display panel 30 (e.g., a liquid crystal display panel), and a paper-like cell 40 are further arranged inside the case 10. A spacer 50 having the same outer shape as that of the flexible substrate 20 and made of a plastic film is placed on the upper surface of the flexible substrate 20. The flexible substrate 20 has through holes for receiving an LSI chip 21 and chip parts 22 such as chip capacitors. The LSI chip 21 and the chip parts 22 are fitted in the holes in the flexible substrate 20 to be mounted thereon. A number of sets of stationary contacts 23 including a pair of contacts 23A and 23B are formed at regular intervals on the upper surface of the flexible substrate 20. The spacer 50 has a number of openings 51 which correspond to each stationary contact 23 on the flexible substrate 20. The spacer 50 has through holes 52 and 53. The through hole 52 corresponds to the LSI chip 21, and the through holes 53 correspond to the chip parts 22. The spacer 50 having the LSI chip 21 and the chip parts 22 fitted therein is adhered to the flexible substrate 20. The flexible substrate 20 and the spacer 50 are fitted within the frame 11 of the case 10. The frame 11 is formed by punching a thin metal sheet of stainless steel or the like into a corresponding shape. The inside space of the frame 11 is divided into space A for receiving the flexible substrate 20, space B for receiving the display panel 30, and space C for receiving the paper-like cell 40 to be described later. The display panel 30 is fitted in the space B of the frame 11 and is arranged at one side of the flexible substrate 20. Connecting terminals 24 for the display panel are regularly arranged at one edge of the lower surface of the flexible substrate 20. As a hot-melt type electrically conductive adhesive is applied on the connecting terminals 24, a film-like connector 31 is fixed to the connecting terminals 24 by means of heating. Thus, the film-like connector 31 is electrically connected to the connecting terminals 24. The paper-like cell 40 is fitted in the space C and is arranged at the side opposite to the side of the flexible substrate 20. The upper and lower electrodes of the paper-like cell 40 are connected to cell connecting terminals 25A and 25B by means of a pair of film-like connecting members 60. The cell connecting terminals 25A and 25B are formed at one edge of the upper and lower surfaces of the flexible substrate 20.

Special care is taken to render the overall paper-like cell 40 thinner. FIG. 4 shows the structure of the paper-like cell 40.

Referring to FIG. 4, the paper-like cell 40 has negative and positive electrode sheets 41A and 41B on its upper and lower surfaces. The electrode sheets 41A and 41B are made of thin metal sheets such as aluminum or stainless steel sheets. The electrode sheets 41A and 41B overlap each other through a holding frame 42. A power generating unit 40A is arranged in a space defined by the electrode sheets 41A and 41B and the holding frame 42. The power generating unit 40A has a metal lithium layer 43, a manganese dioxide layer 44, and a separator 45 interposed therebetween as a partition wall. The separator 45 is a woven fabric made of polypropylene and impregnated with an organic electrolyte. The electrode sheets 41A and 41B are adhered to each other at the periphery of the holding frame 42 by an adhesive 46 as a sealing member, which is made of a composite material containing both organic and inorganic materials. The paper-like cell 40 has a sealed structure. With this sealed structure, the paper-like cell 40 has considerable strength against damage. The features of the structure of the paper-like cell 40 are that the entire outer surfaces of the electrode sheets 41A and 41B serve as electrodes, and that the electrode sheets 41A and 41B function as flat housing sheets. The power generation of the paper-like cell 40 is the same as that of a button-shaped lithium cell.

The thickness of the paper-like cell 40 will be described below. The negative and positive electrode sheets 41A and 41B respectively have a thickness of $50\mu$ (microns) and the metal lithium layer 43 also has a thickness of $50\mu$. The manganese dioxide layer 44 and the separator 45 both have a thickness of $150\mu$. The paper-like cell as a whole has a thickness of $450\mu$. In this case, the paper-like cell 40 is a rectangle having dimensions of about $45 \times 25$ mm. The average life of the paper-like cell 40 is about 2 years when it is used in a compact card-like electronic calculator having both memory and timepiece functions. When the electronic circuit or display panel is improved in a calculator of this type, the life of the paper-like cell 40 can be prolonged further.

The connecting structure between the paper-like cell 40 and film-like connecting members 60 for connecting it to the flexible substrate 20 will be described with reference to FIG. 5.

Each film-like connecting member 60 has a cell adhering portion 60A having a slightly larger area than that of the paper-like cell 40, and a projection 60B projecting from one side of the cell adhering portion 60A. The film-like connecting member 60 has a plastic film as a base film. A conductor 61 extends on the base film from a position substantially at the center of each cell adhering portion 60A toward the end of the projection 60B. An electrically insulated adhesive is applied on the inner surface of the film-like connecting members 60 except for the conductor 61, and a hot-melt type electrically conductive adhesive is applied on the inner surfaces of the conductor 62. The hot-melt type adhesive is molten at relatively low temperatures such as about 130° C. and is solidified at room temperature. The conductor 61 has a double-layer structure consisting of a metal-coated layer and a carbon-coated layer. The metal-coated layer is formed by coating a conductive metal such as gold, silver or copper on a corresponding surface of a base film by means of deposition or printing such as screen printing. The carbon-coated layer is formed from a conductive suspension obtained by mixing a conductive powder such as carbon, a thermoplastic high polymeric material, and a solvent, screen-printing the resultant mixture on the metal-coated layer, and heating the suspension at a low temperature (about 100° C.). The film-like connecting member 60 has a thickness of 50 to 100μ.

Connection between the film-like connecting member 60 and the paper-like cell 40 will be described below. The entire upper and lower surfaces of the paper-like cell 40, that is, the overall outer surfaces of the negative and positive electrode sheets 41A and 41B are flashed with a conductive metal such as nickel. Then, the outer surfaces of the electrode sheets 41A and 41B are smoothened and rendered dense. The cell adhering portions 60A of the film-like connecting members 60 are placed on the outer surfaces of the electrode sheets 41a and 41B. After bending the peripheral portions of the cell adhering portions 60A on the side surfaces of the paper-like cell 40, the cell adhering portions 60A are heated and pressed. Then, the film-like connecting members 60 are adhered on the upper and lower surfaces of the paper-like cell 40, thereby connecting the film-like connecting members 60 to the paper-like cell 40.

With this connecting structure between the paper-like cell 40 and the film-like connecting members 60, no current leakage from the paper-like cell 40 to the frame 11 will occur. This is because the side, upper and lower surfaces of the paper-like cell 40 are completely covered with the base films of the film-like connecting members 60. When the film-like connecting members 60 are adhered to the paper-like cell 40, no thermal damage to the cell 40 will occur. This is because the film-like connecting members 60 can be adhered to the paper-like cell 40 by a hot-melt type adhesive which can be used at low temperatures. Due to the smoothness of the upper and lower surfaces of the paper-like cell 40 which is obtained by flashing, adhesion between the film-like connecting members 60 and the paper-like cell 40 is strong. Although the upper and lower surfaces of the paper-like cell 40 are flashed in the above embodiment, this is not essential to the present invention. Furthermore, in this embodiment, in order to allow contact with the electrode sheets 41A and 41B of the paper-like cell 40, the conductors 61 of the film-like connecting member 60 are formed only at portions of the base films. However, if a conductive adhesive is applied to the entire surfaces of the base films, the film-like connecting members 60 may be rendered conductive over the entire surfaces which are respectively brought into contact with the entire surfaces of the electrode sheets 41A and 41B of the paper-like cell 40.

The film-like connecting members 60 are adhered to the flexible substrate 20 by heating and pressing the projections 60B onto the terminals 25A and 25B of the flexible substrate 20. Thus, electrical connection between the electrodes of the paper-like cell 40 and the terminals 25A and 25B of the flexible substrate 20 is accomplished.

Referring again to FIGS. 2 and 3, the upper and lower panels 12 and 14 of the case 10 are made of metal sheets such as stainless steel or beryllium steel sheets. The upper panel 12 has openings 121 respectively corresponding to the openings 51 of the spacer 50, and a hole 122 for receiving the upper portion of the display panel 30. The upper panel 12 also has recesses 123, 124 and 125 formed by etching in its lower surface. The recesses 123 and 124 receive the upper portions of the LSI chip 21 and the chip parts 22 which project above the spacer 50. The recess 125 receives the upper portions of the film-like connecting member 60 adhered to the upper surface of the paper-like cell 40. The lower surface of the upper panel 12 is adhered to the upper surface of the frame 11, so that the upper panel 12 is formed integrally with the frame 11. The spacer 50 is adhered to the lower surface of the upper panel 12.

The lower panel 14 has in its upper surface a recess 141 formed by etching. The recess 141 receives the lower film-like connecting member 60 adhered to the lower surface of the paper-like cell 40. The lower panel 14 is adhered to the lower surface of the frame 11. Adhesion between the lower panel 14 and the frame 11 is performed after a filler 16 is filled. More specifically, after the flexible substrate 20 having the display panel 30 and the paper-like cell 40 connected thereto is adhered to the lower surface of the spacer 50, and the display panel 30 and the paper-like cell 40 are fitted in the frame 11, the filler 16 is applied inside the frame 11 from the lower surface of the flexible substrate 20. The lower panel 14 is adhered not only to the frame 11 but also to the flexible substrate 20 through the filler 16. The filler 16 serves to fix in position the LSI chip 21 and the chip parts 22 mounted on the flexible substrate 20, the display panel 30 and the paper-like cell 40. The filler 16 can be a quick-dry liquid adhesive which can be hardened at room temperature such as an acrylic- or epoxy-based two-part adhesive. The adhesive is dripped onto the lower surface of the flexible substrate 20 having its upper surface facing downward.

The outer surface of the case 10 obtained by adhering the frame 11 and the upper and lower panels 12 and 14 is covered with an outer member 17 so as to guarantee a complete hermetic seal of the case. The outer member 17 is formed by applying a liquid adhesive of the same type as that used for the filler 16, hardening the adhesive, and cutting any excess portion of the hardened adhesive layer.

The upper and lower sheets 13 and 15 of the case 10 are made of a plastic film and are respectively adhered to the surfaces of the upper and lower panels 12 and 14. In the upper sheet 13, keyboard sections 131 designating ten keys, character keys or function keys are printed on a lower surface of a transparent plastic film, and the overall portion except for a display portion 132 is printed with a non-transparent paint. The display panel 30 is adhered to the lower surface of the display portion 132 of the upper sheet 13 by a transparent adhesive. Contact bases 133 to be inserted in the respective openings 121 of the upper panel 12 are formed on the lower surfaces of the keyboard sections 131 by screen printing or the like. Movable contacts 134 are mounted on the lower surfaces of the contact bases 133 by printing carbon ink or the like. The movable contacts 134 are pressed onto the stationary contacts 23 of the flexible substrate 20 when the operator depresses the keyboard sections 131 of the upper sheet 13 downward so as to elastically deform them. The operation switches therefore are constituted by the movable contacts 134 and the stationary contacts 23.

The compact card-like electronic calculator having the above-mentioned structure can be rendered very thin for the following reasons. That is, a very thin paper-like cell 40 is used, the paper-like cell 40 is arranged at the side opposite to that of of the flexible substrate 20, and connection between the paper-like cell 40 and the flexible substrate 20 is achieved through the film-like connecting members 60, so that not much height is required for connecting the paper-like cell 40 to the flexible substrate 20.

A total thickness of the calculator of this embodiment will be described. The flexible substrate 20, the spacer 50 and the filler 16 respectively have thickness of 200μ, 100μ, and 130μ. The upper panel 12, the upper sheet 13, the lower panel 14, and the lower sheet 15 respectively have thickness of 150μ, 70μ, 150μ, and 50μ. Therefore, the calculator has a total thickness of 850μ which is substantially equivalent to that of a compact card-like electronic calculator using a solar cell. The thickness of the frame 11 of the case 10 is defined by a space between the upper and lower panels 12 and 14. The width of the space has a size corresponding to the sum of the thickness of the flexible substrate 20, the spacer 50, and the filler 16, i.e., 430μ. In this embodiment, the paper-like cell 40 having a thickness of 450μ is used. In this case, the overall thickness of the cell portion including the thickness of the upper and lower film-like connecting members 60 is 550 to 590μ. This thickness is greater than the width of the space between the upper and lower panels 12 and 14, i.e., 430μ. However, as has been described above, the recesses 125 and 141 are formed in the lower and upper surfaces of the upper and lower panels 12 and 14, respectively. These recesses 125 and 141 receive therein the upper and lower portions of the film-like connecting members 60 and the paper-like cell 40. Therefore, the paper-like cell 40 can be received between the upper and lower panels 12 and 14 without increasing the thickness of the equipment.

In this embodiment, the case 10 comprises a multilayer structure constituted by the frame 11, the upper and lower sheets 13 and 15, and the upper and lower panels 12 and 14. The upper sheet 13 may be formed integrally with the upper panel 12. The lower sheet 15 need not be used.

A compact card-like electronic calculator which allows replacement of the paper-like cell 40 according to a second embodiment of the present invention will now be described.

Figure 7:
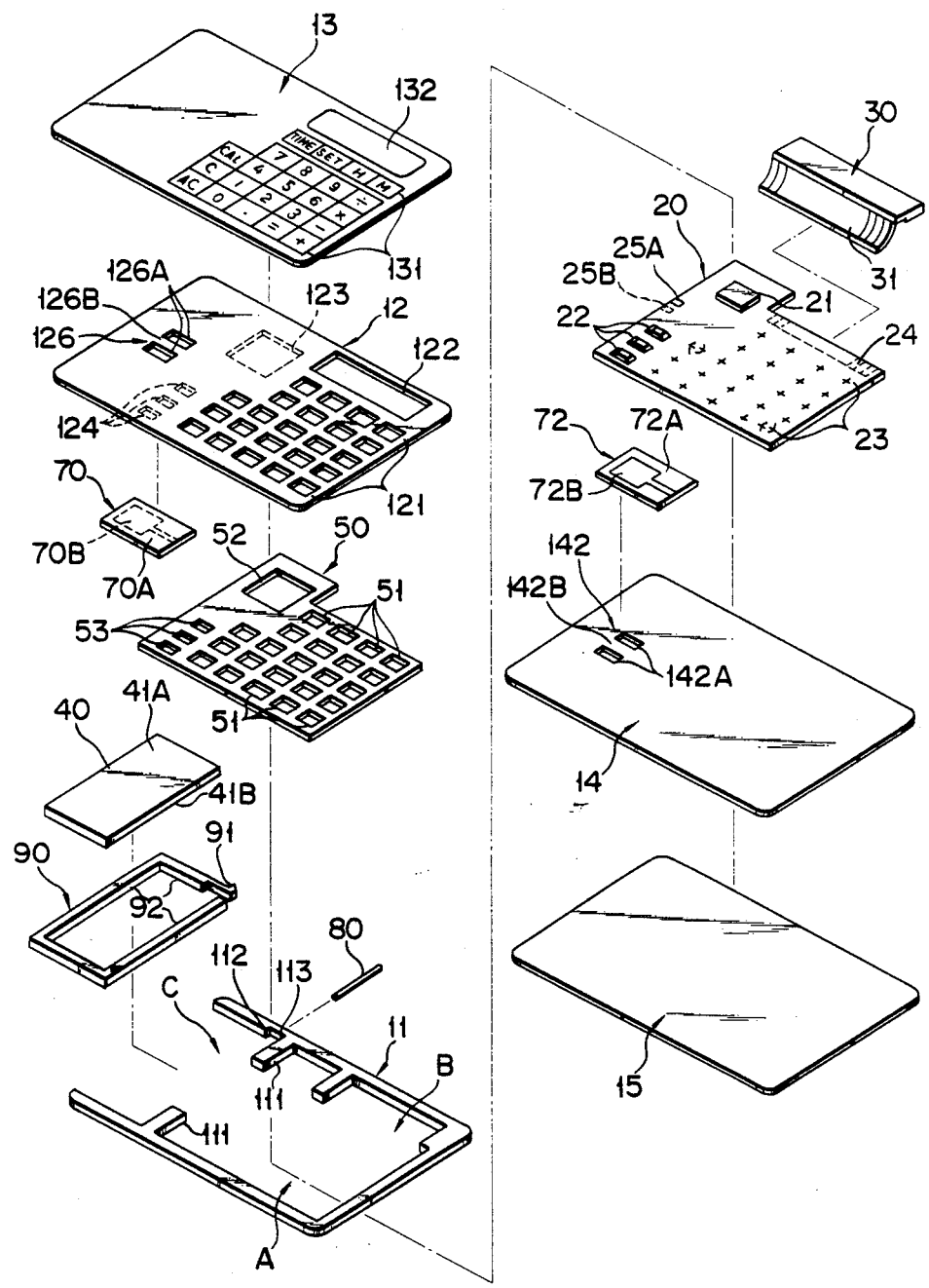
FIG. 7 is an exploded perspective view of the compact electronic calculator shown in FIG. 6.

FIGS. 6 and 7 respectively are a sectional view and an exploded perspective view of this calculator, which are similar to that in FIGS. 2 and 3. As in the case of the calculator shown in FIGS. 1 to 3, the calculator shown in FIGS. 6 and 7 has a calculation function with a memory, and a timepiece function. Like the calculator shown in FIGS. 1 to 3, this calculator uses a thin paper-like cell and is therefore thin. The same reference numerals as in FIGS. 2 and 3 denote the same parts in FIGS. 6 and 7.

The difference between the structures of the first and second embodiments of the present invention will be described with reference to FIGS. 6 and 7.

A press portion 126 for pressing a first connecting member 70 to be described later is formed at the left portion of the upper panel 12 in FIG. 7. The press portion 126 has a pair of parallel slits 126A formed in the upper panel 12, and a bent portion 126B formed by slightly bending downward the portion between the slits 126A. At the press portion 126, the central portion of the bent portion 126B is elastically projected downward from the lower surface of the upper panel 12, and the projecting portion presses the connecting portion 70 downward.

This first connecting member 70 is adhered to that portion of the lower surface of the upper panel 12 which corresponds to the press portion 126 of the upper panel 12. The first connecting member 70 has an insulating sheet 70A and a conductor 70B formed on the lower surface of the insulating sheet 70A. The conductor 70B electrically connects the negative electrode sheet 41A of the paper-like cell 40 to the connecting terminal 25A on the flexible substrate 20.

A press portion 142 of the lower panel 14 is formed at that portion of the lower panel 14 which is opposed to the press portion 126 of the upper panel 16. As in the case of the press portion 126 of the upper panel 12, the press portion 142 has a pair of parallel slits 142A and a bent portion 142B and elastically presses a second connecting member 72 upward. The second connecting member 72 is adhered to that portion of the upper surface of the lower panel 14 which corresponds to the press portion 142 of the lower panel 14. As in the case of the first connecting member 70, the second connecting member 72 has an insulating sheet 72A and a conductor 72B formed on the upper surface of the insulating sheet 72A. The conductor 72B electrically connects a positive electrode sheet 41B of the paper-like cell 40 to the connecting terminal 25B on the lower surface of the flexible substrate 20.

The second embodiment is different from the first embodiment in the structure of the frame 11. As shown in FIG. 7, the frame 11 has one open side which corresponds to space C for receiving the paper-like cell 40. The frame 11 has a recess 112 extending near one partitioning projection 111, and a through hole 113 extending in the recess 112. A release pin 80 can be detached from the through hole 113.

A cell receiving member 90 is detachably mounted in the space C from the open side of the frame 11. The cell receiving member 90 for receiving the paper-like cell 40 is made of stainless steel and has a rectangular shape. The cell receiving member 90 has a projection 91 at a portion corresponding to the recess 112. When the cell receiving member 90 is mounted in the space C, the projection 91 is detachably engaged in the recesss 112. When the releasing pin 80 is inserted in the through hole 113, the projection 91 is disengaged from the recess 112. An insulating coating 92 covers at least the portion of the cell receiving member 90 which is brought into contact with the paper-like cell 40 when the paper-like cell 40 is received in the cell receiving member 90. It is preferable that the insulating coating 92 covers the entire surfaces of the cell receiving member 90. The insulating coating 92 serves to insulate the upper and lower electrode sheets 41A and 41B from each other. Insulating coatings (not shown) are respectively formed on the portions of the lower surface of the upper panel 12 and the upper surface of the lower panel 14 corresponding to the upper and lower surfaces of the paper-like cell 40, except for the first connecting member 70.

The paper-like cell 40 has a structure similar to that of the first embodiment. However, since the paper-like cell 40 is received in the cell receiving member 90, the size of the paper-like cell 40 is smaller than that of the first embodiment and is 40×20 mm.

Mounting of the paper-like cell 40 in the card-like electronic calculator will be described with reference to FIG. 7.

The paper-like cell 40 is placed inside the cell receiving member 90. Thereafter, the cell receiving member 90 is inserted into the space C of the frame 11 from the open side of the frame 11. At this time, the projection 91 of the cell receiving member 90 is engaged in the recess 112 of the frame 11, and the cell receiving member 90 is held in the space C of the frame 11. At the same time, the upper and lower electrode sheets 41A and 41B of the paper-like cell 40 are respectively brought into contact with the conductors 70B and 72B of the first and second connecting members 70 and 72 which are adhered on the lower and upper surfaces of the upper and lower panels 12 and 14. The electrical connection between the paper-like cell 40 and the flexible substrate 20 is achieved by the connecting members 70 and 72.

In order to replace the paper-like cell 40 with a new one, the release pin 80 is inserted into the through hole 113 from the side of the compact card-like electronic calculator, that is, from the side of the frame 11, so as to press inward the projection 91 of the cell receiving member 90. Then, the projection 91 is disengaged from the recess 112. The cell receiving member 90 can then be pulled out from the space C of the frame 11, thereby allowing replacement of the paper-like cell 40.

In the embodiment described above, the cell receiving member 90 for receiving the paper-like cell 40 has a rectangular shape. However, the present invention is not limited to this. A different cell receiving member from the cell receiving member 90 shown in FIG. 7 is shown in FIGS. 8 and 9.

A cell receiving member 190 shown in FIG. 8 has a frame portion 191 different in shape from that of the cell receiving member 90 shown in FIG. 7, and a bottom plate 192 mounted below the frame portion 191. An extension 193 of the bottom plate 192 extends from an end thereof. An insulating coating (not shown) covers the upper surface of the bottom plate 192 and on the inner wall surface of the frame portion 191. A conductor 194 is formed on the insulating coating. One end of the conductor 194 is in contact with the positive electrode sheet 41B of the paper-like cell 40 received in the cell receiving member 190, and the other end thereof is in contact with the connecting terminal 25B on the lower surface of the flexible substrate 20 when the cell receiving member 190 is inserted in the space C. In this manner, the paper-like cell 40 and the flexible substrate 20 are electrically connected with each other. In this case, a press portion 195 similar to the press portion 141 of the above embodiment is formed at the extension 193 of the bottom plate 192 so as to be in contact with the terminal 25B of the flexible substrate 20. A projection 196 similar to the projection 91 of the above embodiment is formed on one side of the frame portion 191.

In the cell receiving member 190 according to the modification described above, the conductor 194 is formed on the bottom plate 192 through the insulating coating. Therefore, the second connecting member 72 and the press portion 142 of the lower panel 14 need not be used. As compared with the calculator of the embodiment shown in FIGS. 6 and 7, the detachable reception and electrical connection of the paper-like cell 40 can be reliably performed.

Figure 9:
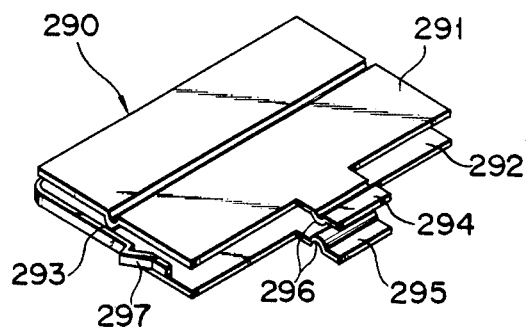

FIG. 9 shows a cell receiving member 290 according to another modification. The cell receiving member 290 is formed by bending a single stainless plate so as to sandwich the paper-like cell 40 therebetween. The cell receiving member 290 has upper and lower portions 291 and 292. Clamp portions 293 for clamping the paper-like cell 40 are formed in the upper and lower portions 291 and 292 so as to oppose each other. Extensions 294 and 295 respectively extend from the sides of the upper and lower portions 291 and 292. A pair of clamp portions 296 are formed in the projections 294 and 295 so as to be in contact with the terminals 25A and 25B of the flexible substrate 20. Insulating coating (not shown) covers the inner surfaces of the upper and lower portions 291 and 292. Conductors (not shown) similar to the conductors 61 of the film-like connecting members 60 as shown in FIG. 5 are formed on these insulating coatings. A projection 297 corresponding to the recess 112 of the frame 11 is formed in the cell receiving member 290.

When the cell receiving member 290 of this modification is used, the press portions 126 and 142 of the upper and lower panels 12 and 14 and the first and second connecting members 70 and 72 need not be used.

Still another modification of a paper-like cell for a compact electronic equipment according to the present invention will now be described with reference to FIGS. 10 and 11.

Figure 10:
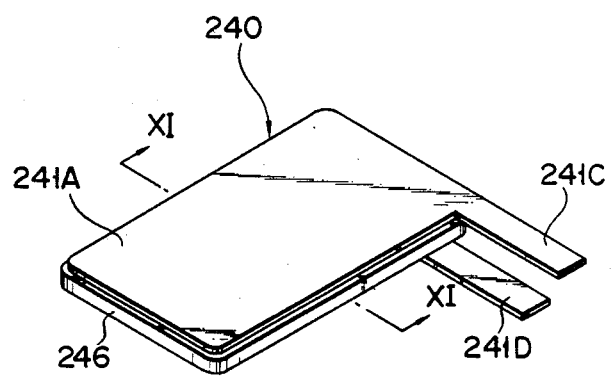
FIG. 10 is a perspective view showing a modification of the paper-like cell.
Figure 11:
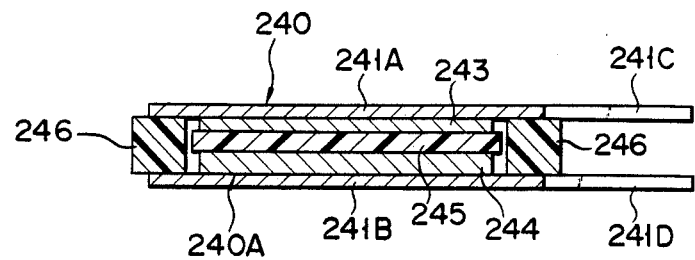
FIG. 11 is an enlarged sectional view showing the paper-like cell shown in FIG. 10 along the line XI—XI therein.

A paper-like cell 240 shown in FIGS. 10 and 11 has a power generating unit similar to that in the paper-like cell 40 shown in FIG. 4. The power generating unit 240A of the paper-like cell 240 has a pair of electrode sheets 241A and 241B. It also has a metal lithium layer 243 and, a manganese dioxide layer 244 and a separator 245 which are formed between the electrode sheets 241B.

However, the paper-like cell 240 shown in FIGS. 10 and 11 is different from the paper-like cell 40 shown in FIG. 4 in the following respects. First, in the embodiment shown in FIGS. 10 and 11, the electrode sheets 241A and 241B have extensions 241C and 241D which extend sideways from the corners of the rectangles of the sheets 241A and 241B. These extensions 241C and 241D connect the paper-like cell 240 to the terminals 25A and 25B of the flexible substrate 20 and therefore serve the same purpose as the film-like connecting member 60 in the first embodiment.

Second, in this embodiment, a sealing member 246 corresponding to the adhesive 46 in FIGS. 4 and 5 extends outward from the peripheries of the electrode sheets 241A and 241B so as to seal the space therebetween. The sealing member 246 is made of a composite material containing both organic and inorganic materials. When the frame 11 made of a metal surrounds the side surfaces of the paper-like cell 240, this sealing member 246 serves to prevent short-circuiting of the electrode sheets 241A and 241B.

When this paper-like cell 240 is used, the first and second connecting members 70 and 72 and the receiving member 90, 190 or 290 are not required and the paper-like cell 240 can be easily mounted inside the space C of the calculator. In addition, this modification of the paper-like cell 240 may be applied to either of the first and second embodiments.

Figure 12:
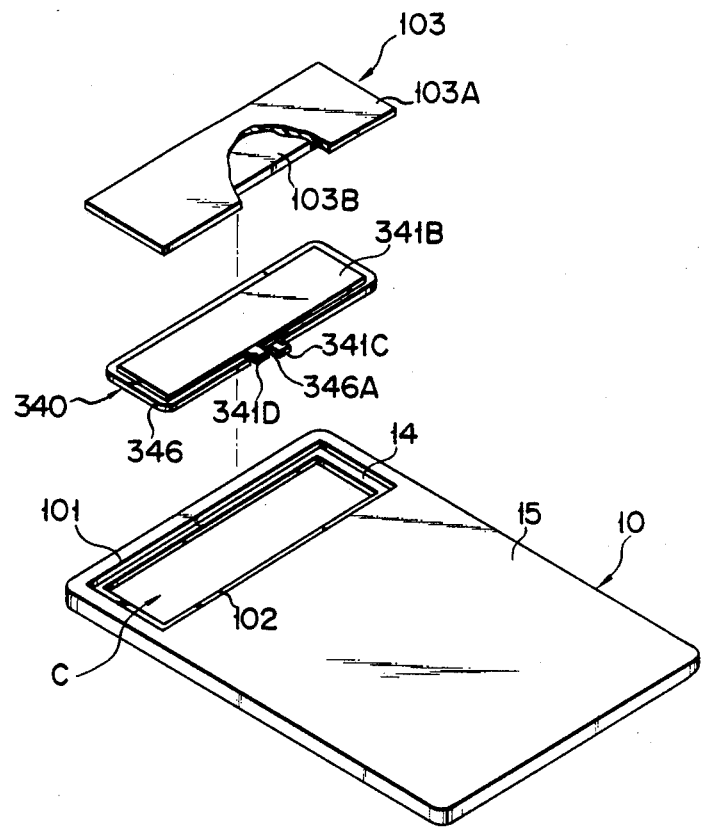
FIG. 12 is an exploded perspective view showing a compact card-like electronic calculator according to still another embodiment of the present invention, showing a paper-like cell to be received in the calculator.

FIG. 12 shows still another embodiment of the present invention wherein an opening for receiving the paper-like cell as shown in FIGS. 10 and 11 is formed in a case 10. A paper-like cell 340 shown in FIG. 12 is similar to that shown in FIGS. 10 and 11. However, the former is different from the latter in that in the former, extending portions 341C and 341D extend from substantially central portions of the opposing sides of a pair of electrode sheets 341A and 341B. The extending portions 341C and 341D are smaller than the extending portions 241C and 241D and extend for a distance substantially the same as that of a sealing member 346. The sealing member 346 has a notch 346A corresponding to the extending portions 341C and 341D. In this embodiment, openings 101 and 102 are formed extending in a lower sheet 15 and a lower panel 14, respectively, of the case 10. The opening 102 of the lower panel 14 has a size which is large enough to receive the paper-like cell 340 therein and is slightly smaller than the opening 101 of the lower sheet 15. A cover member 103 for covering these openings 101 and 102 is illustrated at the upper portion of FIG. 12. The cover member 103 has a sheet portion 103A and a panel portion 103B having a shape corresponding to these openings 101 and 102. An adhesive is applied on the lower surface of the sheet portion 103A and then the panel portion 103B is fixed to the sheet portion 103A.

When the paper-like cell 340 as described above is fitted into the space C, and the cover member 103 is fixed in the exposed portion of the lower panel 14, the openings 101 and 102 are covered with the cover member 103 and the paper-like cell 340 is received in the case 10. When the adhesion between the cover member 103 and the exposed portion of the lower panel 14 is set to be weak and these members are able to be separated, the paper-like cell 340 can be easily replaced. In this embodiment, the paper-like cell 340 can be easily detached through the openings 101 and 102 formed in the lower sheet 15 and the lower panel 14 of the case 10 after the case 10 is assembled.

Figure 13:
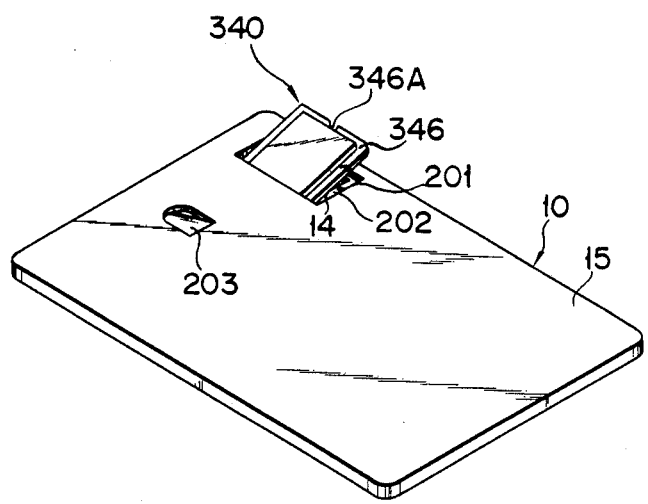
FIG. 13 is a perspective view showing a compact card-like electronic calculator according to still another embodiment of the present invention, showing the state wherein a paper-like cell is inserted into the calculator.
Figure 14:
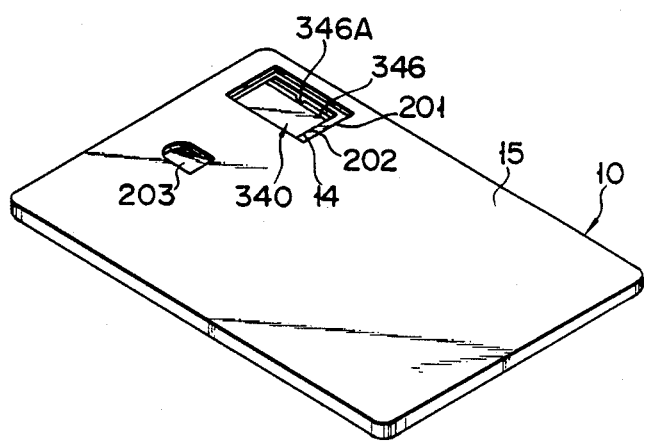
FIG. 14 is a perspective view of the compact card-like electronic calculator of FIG. 13, showing the paper-like cell when inserted.

FIGS. 13 and 14 shown openings for allowing insertion of a paper-like cell 340 into the case therethrough according to still another embodiment of the present invention. Openings 201 and 202 shown in FIGS. 13 and 14 are smaller than the openings 101 and 102 shown in FIG. 12. Since the paper-like cell 340 has slight elasticity, it bends toward the direction opposite to the opening 202 when it is inserted into the space C. Therefore, it can be inserted into the space C through these openings 201 and 202, as shown in FIG. 13. The paper-like cell 340 received in the space C in this manner is pressed by a press portion 203 formed in a lower sheet 15 and a lower panel 14, as shown in FIG. 14. A cover member (not shown) as one shown in FIG. 14 is used to cover the openings 201 and 202. In order to allow replacement of the paper-like cell 340 received in the space C, a sealing member 346 of the paper-like cell 340 has a notch 346A.

In this embodiment, utilizing the elasticity of the paper-like cell 340, the paper-like cell 340 can be easily mounted in and removed from the case 10 through the openings 201 and 202 after the assembly of the case 10.

The present invention is not limited to the card-like electronic calculators as described above, and can be applied to a wide variety of compact electronic equipment.

What is claimed is:

1. A compact electronic device, comprising:
   sheet-like upper case means;
   sheet-like lower case means having a size substantially corresponding to that of said upper case means, said lower and said upper case means each defining two receptacle spaces;
   an integrated circuit chip arranged to be located in a first one of the receptacle spaces of said lower case means;
   a paper-like battery cell having a three-layer structure and arranged to be located in the second one of the receptacle spaces of said lower case means, said battery cell including a pair of positive and negative electrode sheets, a power generating unit interposed between said electrode sheets, and a sealing member adhered to peripheries of said electrode sheets to seal said peripheries;
   thin conductive leads for electrically connecting said electrode sheets of said battery cell to said integrated circuit chip, said conductive leads being arranged for electrical contact with said electrode sheets, respectively, to form a laminated structure which is directly supported between said upper and said lower case means; and
   fixing means for fixing peripheries of said upper and said lower case means relative to one another.

2. A compact electronic device according to claim 1, wherein each thin conductive lead is a film-like connecting member comprising a conductor formed on a plastics film.

3. A compact electronic device according to claim 2, including an adhesive for adhering each said connecting member on a corresponding surface of said battery cell.

4. A compact electronic device according to claim 1, wherein said upper and said lower case means each have an inner surface, and said thin conductive leads are film-like connecting members each comprising a conductor and are fixed on the inner surfaces of said upper and said lower case means to connect with the electrode sheets of said battery cell.

5. A compact electronic device, comprising:
   sheet-like upper case means;
   sheet-like lower case means having a size substantially corresponding to that of said upper case means, said upper and said lower case means each defining first and second receptacle spaces, said lower case means having an opening which communicates with the second receptacle space and is open to an outside of said lower case means;
   an integrated circuit chip arranged to be located in the first receptacle space of said lower case means;
   a paper-like battery cell having a three-layer structure and arranged to be detachably mounted in the second receptacle space of said lower case means through said opening, the cell including a pair of positive and negative electrode sheets, a power generating unit interposed between said electrode sheets, and a sealing member adhered to peripheries of said electrode sheets to seal said peripheries;
   conductive lead means for electrically connecting said electrode sheets of said battery cell to said integrated circuit chip; and
   fixing means for fixing peripheries of said upper and said lower case means relative to one another.

6. A compact electronic device according to claim 5, comprising a cell receiving member for receiving said battery cell, said cell receiving member surrounding at least half of the periphery of said battery cell, and wherein said cell receiving member and said battery cell as surrounded by said cell receiving member are adapted to be detachably mounted in said second receptacle space through said opening.

7. A compact electronic device according to claim 6, wherein said electronic device is a calculator.

8. A compact electronic device, comprising:
   sheet-like upper case means;
   sheet-like lower case means having a size substantially corresponding to that of said upper case means;
   frame means interposed between said upper and said lower case means and having a cut-out section and a shape substantially corresponding to peripheral edges of said upper and said lower case means, said frame means and said upper and said lower case means together defining first and second receptacle spaces, said cut-out section also defining an opening which communicates with the second receptacle space and is open to an outside of said lower case means;

an integrated circuit chip arranged to be located in the first receptacle space of said frame means;

a paper-like battery cell;

a cell receiving member having a thin frame structure formed to extend along the periphery of said battery cell so that said battery cell can be fitted in said cell receiving member, said cell receiving member with said battery cell fitted therein being adapted to be detachably mounted in said second receptacle space through said cutout section;

conductive lead means for electrically connecting said electrode sheets of said battery cell to said integrated circuit chip; and fixing means for fixing peripheries of said upper and said lower case means and said frame means relative to one another.

9. A compact electronic device according to claim 8, wherein said battery cell is formed by a three-layer structure including a pair of positive and negative electrode sheets, a power generating unit interposed between said electrode sheets, and a sealing member adhered to peripheries of said electrode sheets to seal said peripheries.

10. A compact electronic device according to claim 9, wherein said battery cell is arranged to be supported by said upper and said lower case means.

11. A compact electronic device according to claim 8, wherein said cell receiving member includes an engaging section for engaging said frame means when said cell receiving member is mounted in said second receptacle space.

12. A compact electronic device according to claim 8, wherein said cell receiving member has the same thickness as that of said frame means.

13. A compact electronic device according to claim 8, wherein said frame means is made of metal.

14. A compact electronic device according to claim 8, wherein said compact electronic device is a calculator.

15. A compact electronic device, comprising:

sheet-like upper case means;

sheet-like lower case means having a size substantially corresponding to that of said upper case means, and said upper and said lower case means each defining two receptacle spaces;

an integrated circuit chip arranged to be located in a first one of the receptacle spaces of said lower case means;

a paper-like battery cell having a three-layer structure and arranged to be located in the second one of the receptacle spaces of said lower case means, said battery cell including a power generating unit having first and second surfaces, a pair of positive and negative electrode sheets each of which includes a flat surface section formed on the first and second surfaces, respectively, segment lead sections integrally formed with the flat surface sections and extending from the surface sections to electrically connect with said integrated circuit chip, and a sealing member for sealing peripheral edges of said power generating unit and adhering said power generating unit and said electrode sheets to one another; and fixing means for fixing the peripheries of said upper and said lower case means relative to one another.

16. A compact electronic device according to claim 15, wherein said electrode sheets are in contact with said upper and said lower cases to form a laminated structure which is directly supported between said upper and said lower case means.

17. A compact electronic device according to claim 15, wherein the flat surface section of each electrode sheet is larger than the first and second surfaces of said power generating unit.

18. A compact electronic device, comprising:

a slightly deformable paper-like battery cell of a rectangular shape, having a longitudinal side and a lateral side;

an integrated circuit chip;

case means including a pair of sheet-like members having a substantially same shape and defining two receptacle spaces, one of said members having an opening communicating with one of the receptacle spaces, said battery cell and said integrated circuit chip being arranged to be received in corresponding receptacle spaces, said opening being of a size greater than the lateral side of said battery cell and a depth greater than the thickness of said battery cell, said battery cell being inserted into the receptacle space by use of the deformability thereof;

a cover sheet for closing the opening of said case means; and means for adhering said cover sheet to said case means in the region of said opening.

19. A compact electronic device according to claim 18, wherein said case means includes a frame section which defines said receptacle spaces and said cover sheet is adhered to said frame section.

* * * * *